United States Patent Office 3,695,863
Patented Oct. 3, 1972

3,695,863
STEELMAKING
Arnold Metcalf, 16 The Chase, Clarkdell, Sheffield 10, England, and Willis Bateman, 96 Kilton Hill, Worksop, England
Filed Jan. 13, 1963, Ser. No. 337,355
Int. Cl. C21c 5/28
U.S. Cl. 75—60
6 Claims This invention concerns steelmaking processes and is more particularly concerned with steelmaking in a furnace employing an oxygen-fuel burner.

An object of the present invention is to provide a steelmaking process employing an oxygen-fuel burner whereby wholly cold furnace charges consisting of widely varying proportions of scrap and pig iron can be melted and refined.

The term oxygen-fuel burner, referred to hereinafter simply as a burner, is intended to be understood as a burner supplied with hydrocarbon fuel and oxygen, and which burner provides intimate and complete mixing of the fuel and oxygen.

The hydrocarbon fuel, generally referred to herein simply as fuel, may be in one or a combination of forms such as gas, light fuel oil or heavy fuel oil; while the oxygen may be supplied as oxygen-containing gas such as oxygen-enriched air and the term oxygen is intended to embrace such gas in addition to pure oxygen. During use, there will normally be additional sources of oxygen present, such as in entrained air, and reference will variously be made to total oxygen to comprise all sources, including that to the burner, and to oxygen supply or supplied to denote that supplied direct to the burner.

Proposals have in fact been made previously for the use of oxygen-fuel burners in steelmaking processes, but such use has generally been by way of ancillary heating during melting. In the event that such burners have been used additionally during refining, then invariably the fuel supply is discontinued and the burner is fed only with oxygen. Thus the burner is employed in such instances as an oxygen lance or gun, and such operation is accompanied by the formation of copious red fumes of iron oxide. This formation of fume not only gives rise to appreciable loss of metal as metallic oxide, but also necessitates the use of costly and elaborate waste gas cleaning equipment.

According to one aspect of the present invention there is provided a steelmaking process in which a furnace charge is melted and refined solely as a result of combusting an intimate mixture of hydrocarbon fuel and oxygen.

In another aspect of the present invention there is provided a steelmaking process in which a furnace charge is melted and refined as a result of combusting an intimate mixture of hydrocarbon fuel and oxygen, the combustion being maintained throughout the refining period whereby substantially no iron oxide fume is produced.

Figure 1:
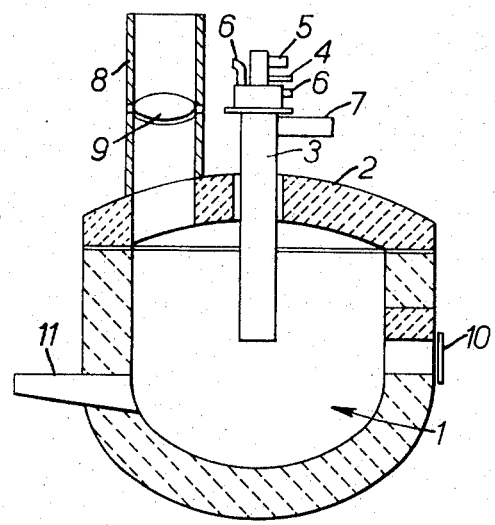
Figure 3:
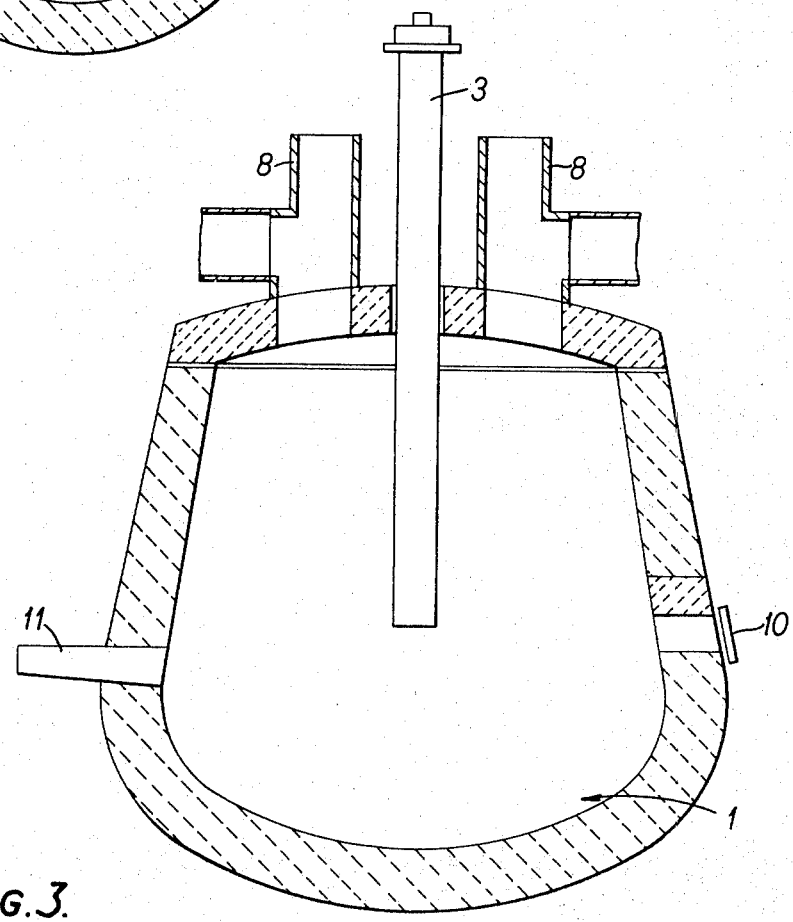
Figure 2:
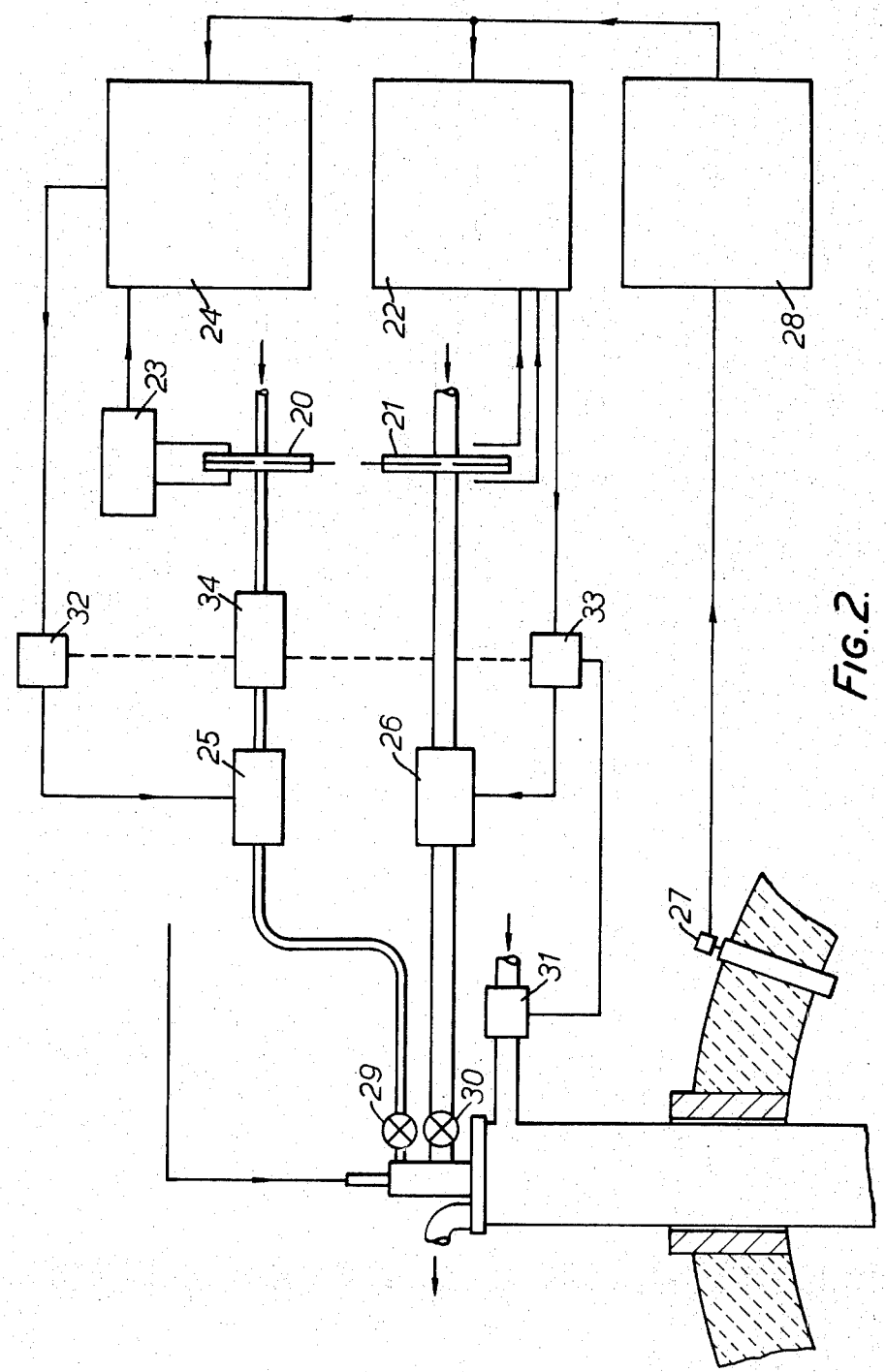

In order that the invention may be clearly understood and readily effected the same will now be more fully described with reference to the accompanying drawings, in which drawings:

FIG. 1 shows one apparatus arrangement as employed during the development of the invention, FIG. 2 illustrates schematically one form of suitable burner control system, and FIG. 3 illustrates another form of furnace suitable for use with the present invention.

FIG. 1 illustrates the general arrangement of furnace vessel and burner. The furnace vessel 1 was produced by adapting a 10 cwt. electric arc furnace by removing the electrodes and rebuilding the roof 2 in monolithic refractory to provide separate apertures for burner entry, at the roof centre, and waste gas exit. The furnace retained the conventional charging door 10, tapping spout 11, and tilting gear (not shown) to facilitate slag removal and tapping. The burner, indicated at 3, was provided with oxygen and fuel supply lines 4 and 5, respectively, and water supply inlet and outlet lines 6, for the water-cooled jacket which extended along the entire length of the burner. Use was made of the existing electrode hoist mechanism for raising and lowering the burner, part of the centre electrode hoist arm being indicated at 7, although an arrangement of a cable, pulley wheels and a winch would be equally appropriate.

A stack 8 was fitted, over the waste gas outlet from the furnace, and this stack was provided with a damper 9 which was adjustable to control the draught and thus the pressure in the furnace and the amount of air inleakage.

In the development of the present invention a considerable number of "heats" have been worked in the furnace described above. For an initial understanding of the present invention then a typical one of such heats will now be described.

The furnace was first preheated with a gas-air burner until the temperature of the refractory lining reached 800 to 900° C. The oxygen-fuel burner was then inserted and fired with light fuel oil at a rate of 20 gallons/hour and oxygen at 6000 cubic feet/hour, and when the furnace roof temperature reached 1000 to 1100° C. the fuel input was raised to 25 gallons/hour and oxygen supply to 7000 cubic feet/hour, the burner was lowered to within about 3 feet of the furnace hearth and charging began.

The charge in this example was 6 cwt. steel tube scrap, 4 cwt. of pig iron, and 40 lbs. of limestone, the charge being fed manually into the furnace through the charging door.

As the charge built up inside the furnace, the burner was raised so that the scrap-to-burner distance remained relatively constant and when all the charge had been loaded the burner was brought down through the charge as quickly as possible so that the waste gases travelled upwardly through the charge prior to leaving the furnace, thus promoting good heat transfer. The burner was halted at about 2 to 2½ feet from the hearth, in which position the lower part of the burner was surrounded by the scrap, and the oil flow was maintained at 25 gallons/hour and the oxygen flow at 7500 cubic feet/hour which together with infiltrated air gave a small excess of oxygen in the waste gases.

The burner was maintained in this position until it became evident that a molten pool of metal had developed in the centre of the hearth, following which the burner was raised slowly until the scrap which had surrounded the burner was now directly exposed to the flame and the burner was maintained at such position.

During this melting down period the fuel input was controlled to prevent the roof temperature from exceeding 1600 to 1650° C. In practice the roof temperature reached 1600° C. after 18 minutes and the fuel flow was reduced to 15 gallons/hour and the oxygen supply rate to 4500 cubic feet/hour. Additionally, furnace pressure was regulated to prevent excessive "sting" and to control the amount of inleaking air.

When the bath was flat, with about three-quarters of the charge molten after approximately 30 minutes, the bath was rabbled, sampled and a temperature taken. Analysis of the sample showed the carbon content to be 1.3%.

The oxygen flow was then increased to 6000 cubic feet/hour to promote a carbon boil. Bearing in mind that 25 gallons/hour and 7500 cubic feet/hour correspond to nominally 87% stoichiometric oxygen supply, the rates of 15 gallons/hour and 6000 cubic feet/hour correspond to nominally 116% stoichiometric. Thereafter, the rate of carbon removal was controlled by variation of the oxygen flow so that the metal temperature was increasing at such a rate as to be 10/20° C. below tapping temperature when the desired carbon level was reached. Some 45 minutes after start-charge, the carbon content had been reduced to 0.22% and the metal was at a temperature of 1580° C. At this stage de-oxidation was effected by the addition of 7 lbs. of ferrosilicon followed by the addition of 12 lbs. of ferromanganese.

When these additions had melted after a further 3–4 minutes, the metal was tapped at a temperature of 1600° C. and the composition of the steel made was as follows: 0.27% C, 0.15% Si, 0.83% Mn, 0.025% P and 0.04 S.

Following development with the small furnace, a number of heats have been carried out in a 5 ton unit. This unit was a similar construction to that shown in FIG. 1 but the roof was removable to permit rapid basket charging.

A typical example of experience with this larger furnace showed a 4 ton charge of mixed heavy and light steel scrap with added carburiser to be melted in 70 minutes and tapped at 0.2% C in 90 minutes. The fuel consumption was 22 gallons/ton of tapped steel and oxygen consumption 6500 cubic feet/ton. In this particular instance the maximum fuel supply rate was limited to 60 gallons/hour because the draughting was inadequate to remove the waste gases at higher fueling rates: higher firing rates would be expected to reduce the time from charging to tapping.

Considering more general points in the operation of the present invention as noted above, a wide range of charges may be employed and, during development, charges have been used comprising 70/30 scrap/pig iron, 70/30 scrap/cast iron, 50/50 scrap/cast iron, 80/20 scrap/cast iron and 100% scrap with a suitable carburising agent. All forms of scrap from heavy to light have proved usable.

Carbon addition is normally effected initially with the charge and suitable carburising agents for this purpose are anthracite, coke, and petroleum coke, for example, as employed in electric arc furnace practice.

In general during the melting period, the oxygen flow to the burner is less than stoichiometric, the proportion of oxygen being about 80 to 90%, or nominally 87%, while total oxygen admission during melting will produce a slight excess over that required for complete fuel combustion.

A particularly significant feature of the present invention concerns the control of the rate of carbon removal which, by virtue of the present invention, can be effected substantially independently of temperature control.

This arises from the fact that the rate of temperature increase of the bath caused by oxidation of carbon and other metalloids is supplemented by heat from the combustion of the burner fuel. The rate of metalloid removal is largely dependent on the oxygen in excess of that employed in combusting the fuel. The supplementary heat depends on the rate of fuel supply so that by varying the fuel supply rate and the total oxygen supply, the temperature rise and carbon drop can be controlled essentially independently of each other.

In carrying out the process of the present invention there are preferably provided means for control of oxygen and fuel supplies, automatic fuel-oxygen ratio control, an overriding refractory roof temperature control and a fail-safe control on cooling water supply. These requirements are largely met by the control system illustrated diagrammatically in FIG. 2.

In FIG. 2 both the fuel flow and oxygen flow are metered by orifice gauges 20 and 21, respectively. The differential pressure output from the oxygen orifice is fed directly to a mercurial flow recorder in the oxygen controller 22 and the differential pressure output from the fuel orifice is fed via a pneumatic transmitter 23 to a Bourdon tube recorder in the fuel controller 24. The outputs from the two controllers are connected directly to respective diaphragm control valves 25 and 26 situated in the input lines to the burner. The valve positions are dependent on the output signals from their respective controllers.

Included in the controllers are "Remoset" ratio transmitters for maintaining a required fuel/oxygen ratio in controlled manner.

The overriding temperature control is effected in response to a thermocouple 27 located in the furnace roof, the output from such thermocouple being applied to the temperature controller 28 the output from which, in turn, is applied to the oxygen and fuel controllers such that when the maximum required refractory temperature level is attained, the fuel and oxygen flow rates are adjusted automatically and simultaneously while maintaining the same ratio until such time as change in this ratio is required, as noted above.

The dangers associated with mixing oil and oxygen are well known and to minimise risks of explosion or the like an internal shut-off valve (not shown) is provided and located at the tip of the burner. Check valves 29 and 30 are also connected in the input lines adjacent the burner. The function of these non-return valves is to prevent oil from entering the oxygen line, and vice versa.

To provide against the danger of waster failure to the burner cooling system, a safety device 31, which operates in dependence on water flow, is installed in the cooling water line. This device may be in the form of a switch arranged for alarm operation in the event that the rate of water flow falls below a predetermined value, whereby in the alarm state the switch actuates solenoid valves 32 and 33 located in the fuel and oxygen control circuits. The pressure of the supplies to the control valves are accordingly relieved and the control valves close, thus isolating the fuel and oxygen. Also, the fuel Supply pump 34 located in the fuel supply line before control valve 25 is stopped from operation in the event of such alarm.

Returning once more to considerations of suitable furnace vessels for the present purpose, the vessel may be a converted arc furnace, ladle or other vessel; but clearly a specially designed vessel is preferred. Even so, the general form of the vessel will be similar to that employed for electric arc furnaces although a somewhat greater height-to-diameter ratio is preferred. Again, while the vessel may be cylindrical, it will preferably have sloping, or partly sloping walls to assist scrap to fall into the path of the burner flame.

The furnace roof may be as shown in FIG. 1, namely having separate burner and waste gas openings, but alternatively these may be combined in a single port. A further alternative is that the waste gas outlet may be sited in the upper section if a sloping furnace wall, or there may be more than one such opening leading to a common stack. The furnace may be tapped through a suitably positioned tap hole in the furnace wall; while in the case of changing this may be effected from the top of the furnace or through a charge door in the furnace wall. Again, while reference has been made above to the use of a single burner, more than one burner may be employed such as in the case of a large vessel.

FIG. 3 of the drawings illustrates in section a suitable form of furnace, various features of such furnace being noted above in the more general remarks, apart from the two waste gas outlets which assist in better distributing of the combustion products within the furnace.

From the above description it will be seen that the present invention provides a steelmaking process with sole use of an oxygen-fuel burner whereby a wholly cold charge can be melted and refined without any substantial fume formation by maintaining the fuel low throughout the refining period.

The charge may consist of scrap and pig iron but can be entirely of scrap, with a suitable carburising agent, and all forms of scrap from heavy to light have proved usable. Carbon and low-alloy steels of current specifications have been made with metallic yields in excess of 90%.

A feature of the invention is that of effective independent control of the rates of temperature increase and carbon removal by appropriate control of the oxygen and fuel supplies to the burner.

The amounts of fuel and oxygen used, as judged from individual heats on a 5 ton scale, are approximately 22 gallons and 6500 cubic feet per ton of finished steel. However, it seems likely that under continuous operation these values would be reduced. Also, with adequate firing rates a heat may be carried out in less than 1½ hours charge-to-tap. In these circumstances the process appears cheaper to operate than an electric arc furnace of equivalent output.

Regarding employment of the process of the present invention, it could be used along with basic oxygen furnaces to consume the scrap that cannot be used as coolant in the converters, and it can also be regarded as an independent steelmaking process in its own right for use in a non-integrated steelworks.

We claim:

1. A steelmaking process which comprises melting a solid ferrous charge by combusting an intimate mixture of hydrocarbon fuel and and oxygen by means of a burner while moving the burner from an initial position in which the flame is in intimate contact with the solid charge, down into the charge and, when a pool of molten metal forms, progressively withdrawing the burner upwards and maintaining the combustion of said hydrocarbon fuel and oxygen throughout the refining of the charge.

2. A steel making process which comprises establishing a solid charge melting the charge by combustion of an intimate mixture of a hydrocarbon fuel and oxygen having no greater than a stoichiometric proportion of oxygen introduced the charge by means of a burner moving the burner down into the charge to initiate melting and on formation of a molten metal pool progressively withdrawing the burner upwardly through the charge, and refining the charge by combustion of a mixture of hydrocarbon fuel and oxygen having an excess of oxygen over stoichiometric.

3. A process according to claim 2, in which less than a stoichiometric quantity of oxygen is supplied through said burner during melting with additional oxygen being admitted through other means.

4. A process according to claim 2 in which the furnace pressure is controlled to control the amount of inleaking air.

5. In a process for the manufacture of steel which includes the step of refining a molten ferrous metal charge by top blowing it with at least one stream of oxygen, the improvement comprising introducing into said oxygen stream, continuously throughout said refining step, a nongaseous fluidized fuel in an amount sufficient to suppress the formation of iron oxide fumes.

6. The process of claim 5 wherein the nongaseous fluidized fuel is a liquid hydrocarbon material.

References Cited

UNITED STATES PATENTS

| | | | |
|---|---|---|---|
| 2,446,511 | 8/1948 | Kerry et al. | 74—43 |
| 2,515,670 | 7/1950 | Slottman et al. | 75—43 |
| 2,603,476 | 7/1952 | Whiston | 75—60 |
| 2,671,724 | 3/1954 | Kompart | 75—43 |
| 3,084,039 | 2/1963 | Baum | 75—59 |
| 3,129,930 | 4/1964 | Labat-Camy | 75—60 |
| 3,194,650 | 7/1965 | Kurzinski | 75—43 |

FOREIGN PATENTS

| | | | |
|---|---|---|---|
| 3,165,398 | 1/1965 | Japan | 75—40 |
| 3,232,748 | 2/1966 | Austria | 75—60 |
| 3,234,011 | 2/1966 | Austria | 75—60 |
| 234,295 | 6/1961 | Australia | 75—60 |

L. DEWAYNE RUTLEDGE, Primary Examiner

G. K. WHITE, Assistant Examiner

UNITED STATES PATENT OFFICE
CERTIFICATE OF CORRECTION

Patent No. 3,695,863  Dated October 3, 1972

Inventor(s) ARNOLD METCALF and WILLIS BATEMAN

It is certified that error appears in the above-identified patent and that said Letters Patent are hereby corrected as shown below:

Claims priority British application No. 1948, filed January 16, 1963

Signed and sealed this 3rd day of April 1973.

(SEAL)
Attest:

EDWARD M. FLETCHER, JR.　　　　　　ROBERT GOTTSCHALK
Attesting Officer　　　　　　　　　　Commissioner of Patents